United States Patent
Dudar

(10) Patent No.: US 9,890,745 B2
(45) Date of Patent: Feb. 13, 2018

(54) SYSTEMS AND METHODS FOR FUEL VAPOR CANISTER PURGE ROUTING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 14/948,790

(22) Filed: Nov. 23, 2015

(65) Prior Publication Data

US 2017/0145963 A1    May 25, 2017

(51) Int. Cl.
*F02M 25/08* (2006.01)
*B60K 15/035* (2006.01)

(52) U.S. Cl.
CPC ... *F02M 25/0836* (2013.01); *B60K 15/03504* (2013.01); *F02M 25/089* (2013.01); *F02M 25/0854* (2013.01); *F02M 25/0872* (2013.01); *B60K 2015/03514* (2013.01); *F02M 25/0809* (2013.01)

(58) Field of Classification Search
CPC .......... F02M 25/0836; F02M 25/0854; F02M 25/0872; F02M 25/089; F02M 25/0809; F02D 41/004; B60K 2015/03514; B60K 2015/03504
USPC .............................. 123/516, 518–520, 198 D
See application file for complete search history.

(56) References Cited

U.S. PATENT DOCUMENTS

| | | | | |
|---|---|---|---|---|
| 5,245,973 A * | 9/1993 | Otsuka | ............... | F02M 25/0809 123/198 D |
| 5,443,051 A * | 8/1995 | Otsuka | ............... | F02M 25/0809 123/198 D |
| 6,371,089 B1 * | 4/2002 | Matsuoka | ............. | B60K 6/365 123/519 |
| 7,107,971 B2 | 9/2006 | Spink et al. | | |
| 8,191,536 B2 | 6/2012 | Devries et al. | | |
| 8,528,527 B2 | 9/2013 | Rauner et al. | | |
| 8,752,530 B2 | 6/2014 | Pearce et al. | | |
| 2014/0123961 A1 | 5/2014 | Kragh et al. | | |
| 2014/0130781 A1 * | 5/2014 | Jentz | ................. | F02M 25/0809 123/520 |
| 2016/0290286 A1 * | 10/2016 | Dudar | ................ | F02M 25/0836 |
| 2016/0356247 A1 * | 12/2016 | Dudar | ................ | F02M 25/0827 |
| 2017/0008390 A1 * | 1/2017 | Dudar | ............. | B60K 15/03006 |
| 2017/0037806 A1 * | 2/2017 | Dudar | .................. | F02D 41/222 |
| 2017/0045007 A1 * | 2/2017 | Pursifull | ............. | F02D 41/0032 |

* cited by examiner

*Primary Examiner* — Hai Huynh
*Assistant Examiner* — Gonzalo Laguarda
(74) *Attorney, Agent, or Firm* — James Dottavio; McCoy Russell LLP

(57) ABSTRACT

A method for an engine is presented, wherein purge air is routed through a fuel vapor canister during a first condition such that desorbed fuel vapor traverses a canister purge port en route to an engine intake, and wherein purge air is routed through a fuel vapor canister during a second condition such that desorbed fuel vapor traverses a canister load port en route to the engine intake. Bypassing the canister purge port during a canister purge event allows for cleaning adsorbed fuel vapor from the canister even if flow through the canister purge port is restricted. In this way, vehicle emissions may be mitigated during conditions where a carbon dust filter at the canister load port is clogged.

8 Claims, 6 Drawing Sheets

SYSTEMS AND METHODS FOR FUEL VAPOR CANISTER PURGE ROUTING

FIELD

The present description relates generally to methods and systems for controlling an evaporative emissions system to dynamically route purge air through a fuel vapor canister.

BACKGROUND/SUMMARY

Vehicles sold in North America are required to adsorb refueling, diurnal, and running loss fuel vapors within a fuel vapor canister. Once the canister is loaded with vapors, engine intake vacuum may be used to draw fresh air through the canister, desorbing the fuel vapors to the engine intake where they may be combusted.

Activated carbon granules or pellets are commonly used to adsorb hydrocarbons within the fuel vapor canister. As the canister ages, carbon dust may break away from the granules, and may be drawn into the canister purge line during purge events. Buildup of carbon dust within the purge line may prevent complete closure of a canister purge valve, causing the valve to leak. A leaky purge valve results in engine vacuum being applied to the fuel system constantly, which may damage the fuel tank and other fuel system components, may result in unmetered fuel vapor being drawn into the engine, and may increase levels of undesired emissions.

Other attempts to address purge valve fouling include placing a carbon dust filter within the fuel vapor canister to prevent the egress of carbon dust into the purge line. One example approach is shown by Pearce et al. in U.S. Pat. No. 8,752,530. Therein, a filter is placed within the canister near the purge port. However, the inventors herein have recognized potential issues with such systems. As one example, the carbon dust filter may become clogged over time, reducing the effectiveness of purge routines. As such, the canister may become saturated with fuel vapor, increasing undesired emissions. Further, undesired emissions tests may be affected if engine intake vacuum is used to evacuate the fuel system via the canister purge port.

In one example, the issues described above may be addressed by a method for an engine wherein purge air is routed through a fuel vapor canister during a first condition such that desorbed fuel vapor traverses a canister purge port en route to an engine intake, and wherein purge air is routed through a fuel vapor canister during a second condition such that desorbed fuel vapor traverses a canister load port en route to the engine intake. Bypassing the canister purge port during a canister purge event allows for cleaning adsorbed fuel vapor from the canister even if flow through the canister purge port is restricted. In this way, vehicle emissions may be mitigated during conditions where a carbon dust filter at the canister load port is clogged.

As one example, a purge routing valve may be used to bypass the canister purge port by coupling the canister load port to a canister purge line if the canister purge port is restricted. Such a purge routing valve also allows for diagnostic testing to discern flow restrictions through the canister purge port. In this way, the life of the canister may be increased by merely replacing a clogged carbon dust filter rather than the entire canister.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
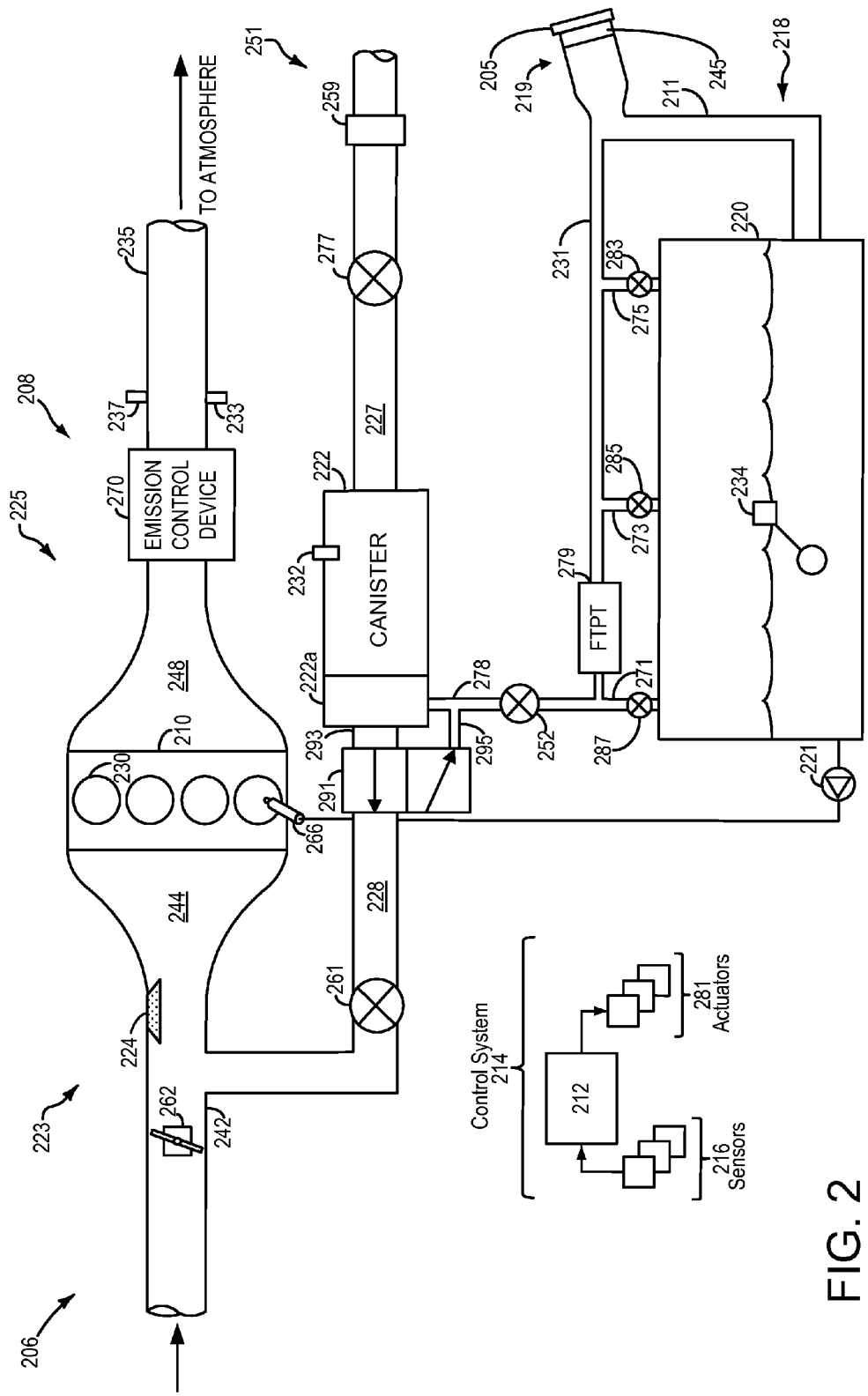
FIG. 2 schematically shows an example vehicle system with a fuel system and an evaporative emissions system.
Figure 3A:
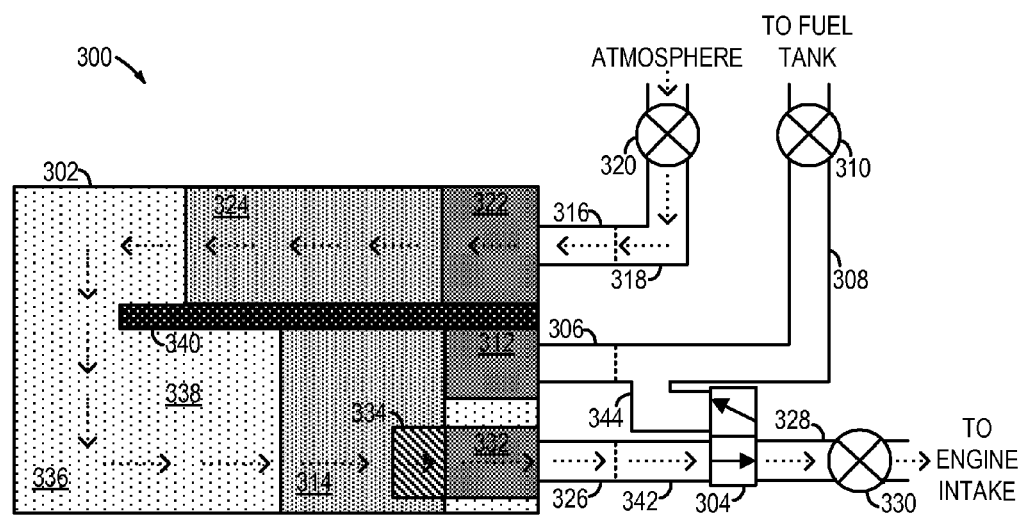
FIG. 3A schematically shows a fuel vapor canister fluidically coupled to an engine intake via a canister purge port.
Figure 3B:
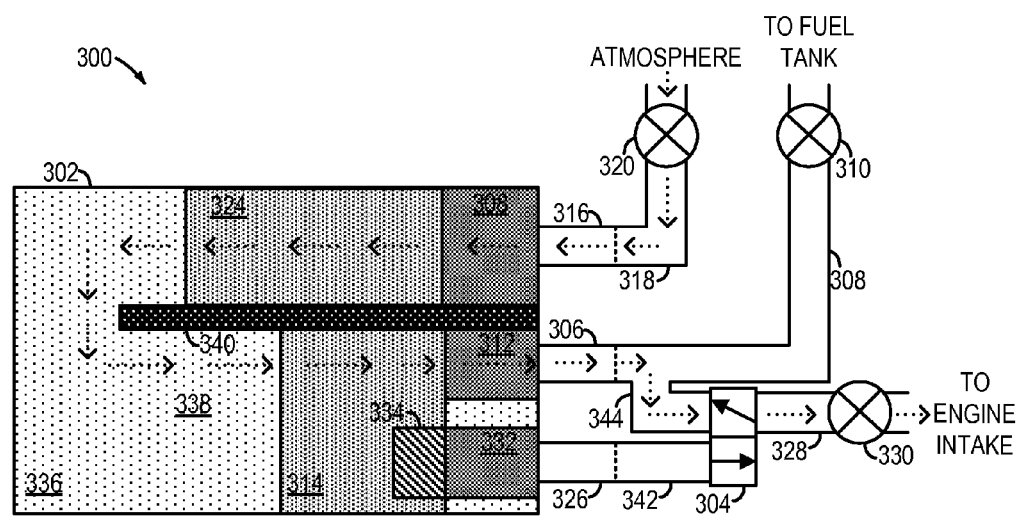
FIG. 3B schematically shows a fuel vapor canister fluidically coupled to an engine intake via a canister load port.
Figure 4:
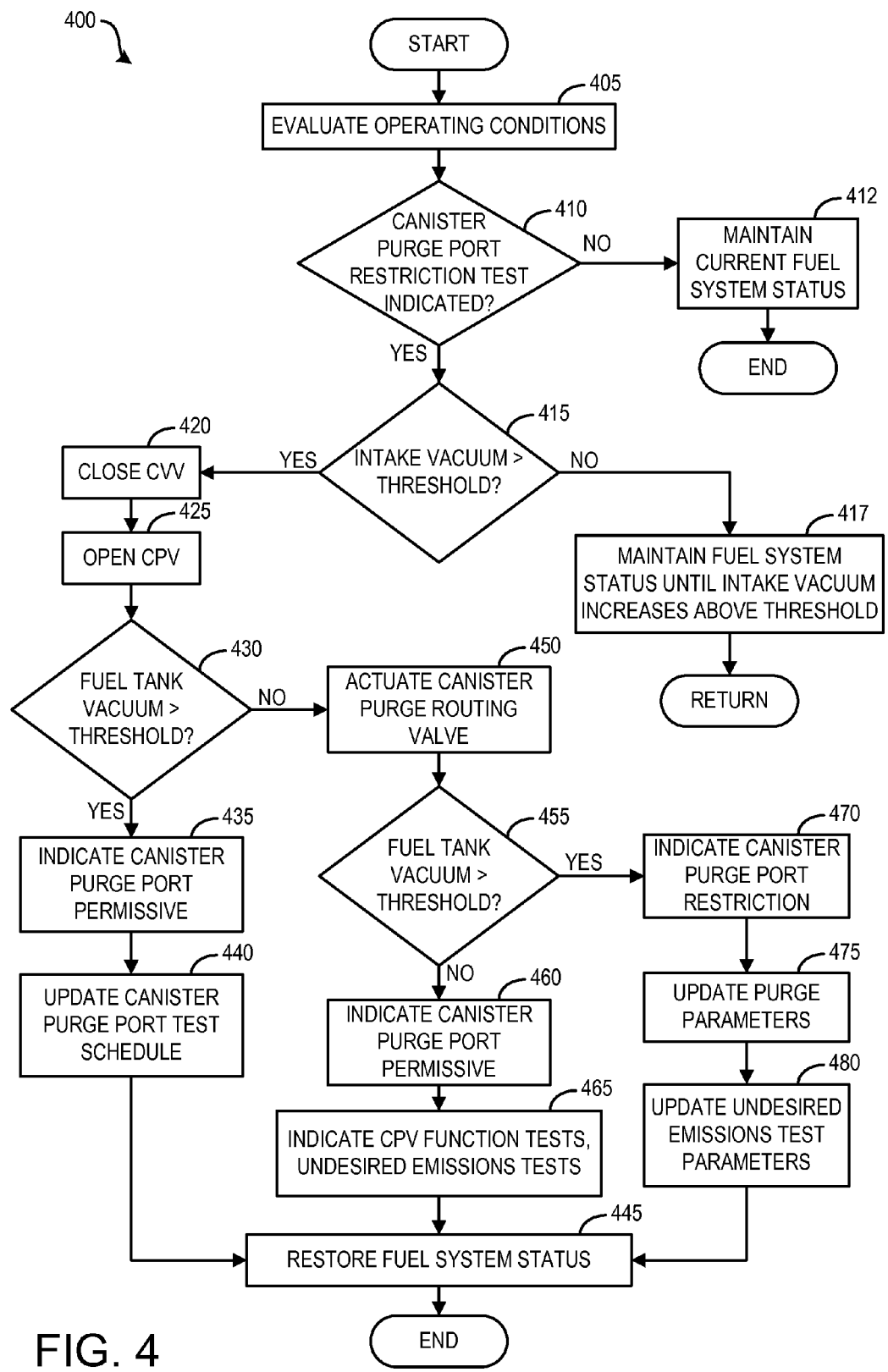
FIG. 4 depicts a flow chart for a high-level method for a canister purge port restriction diagnostic test.
Figure 5:
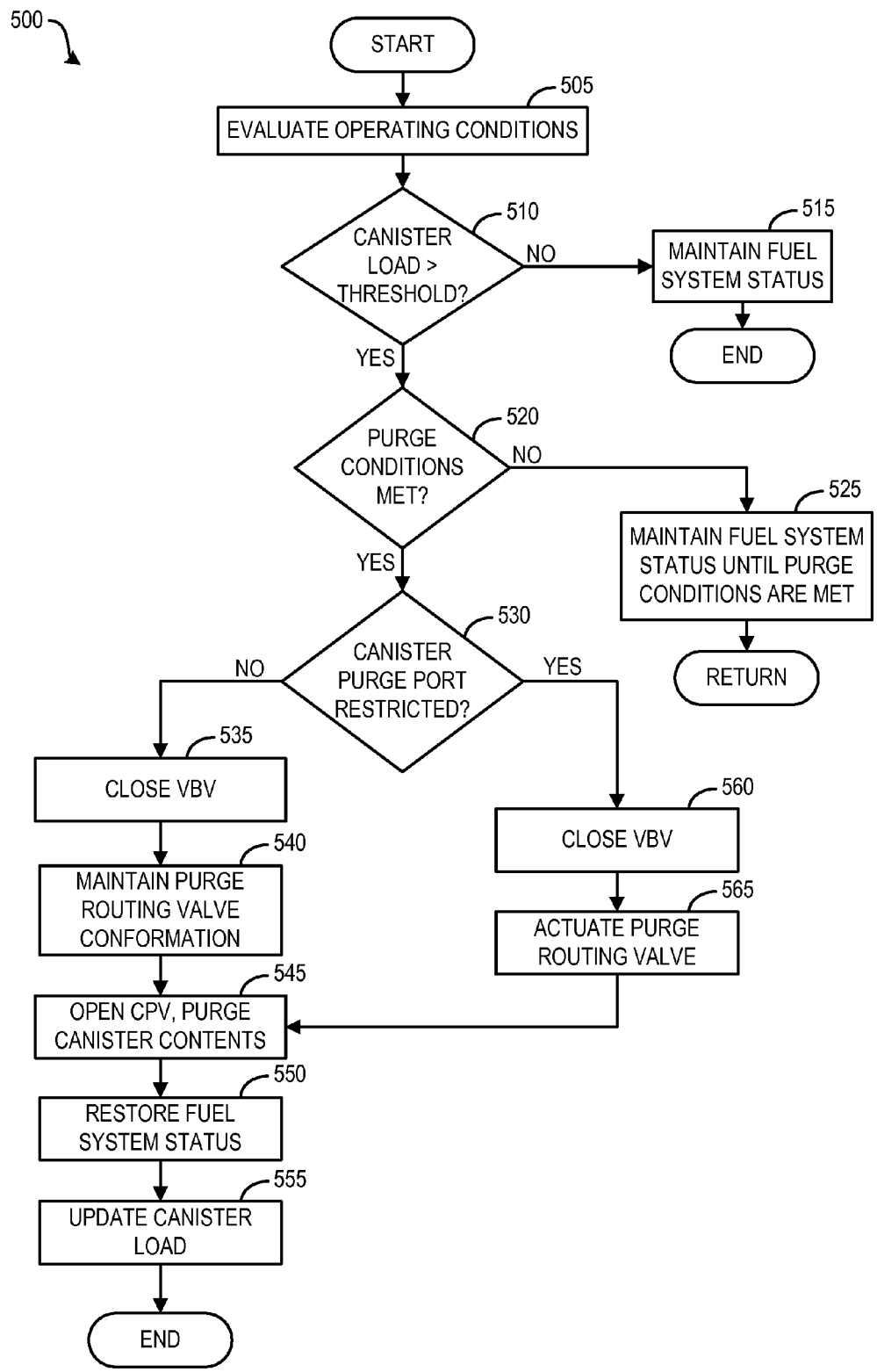
FIG. 5 depicts a flow chart for a high-level method for a canister purge event.
Figure 6:
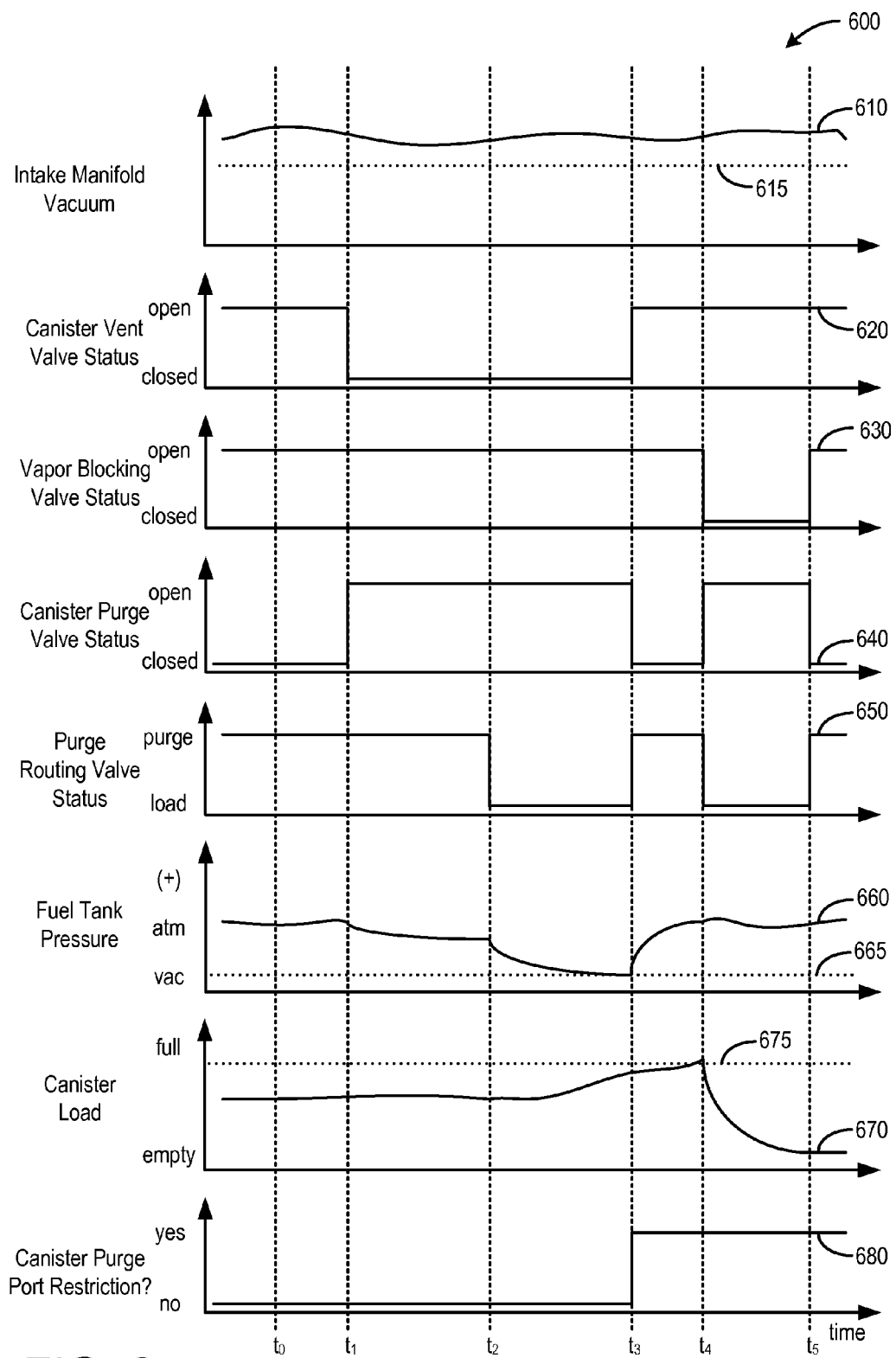
FIG. 6 depicts an example timeline for operating a fuel system comprising a canister purge routing valve.

The following description relates to systems and methods for purging a fuel vapor canister. In particular, the description relates to systems and methods for discerning a restriction of a fuel vapor canister purge port, and for purging the fuel vapor canister via an alternate pathway responsive to a canister purge port restriction. A fuel vapor canister may be provided to trap fuel vapor from a fuel tank coupled to a vehicle propulsion system, such as the propulsion system shown in FIG. 1. The fuel vapor canister may also be coupled to an engine intake, as shown in FIG. 2. Fuel vapor may be delivered from the fuel tank to the fuel vapor canister via a canister load port, binding to activated carbon granules within the canister, while gasses stripped of fuel vapor exit the canister to atmosphere via a canister purge port. During a purge operation, the engine intake may be coupled to the fuel vapor canister via the purge port, drawing atmospheric air through the canister, desorbing bound fuel vapor to the engine for combustion. Over time, the activated carbon granules may degrade, and carbon dust may be drawn towards the engine intake through the purge port. As such, a canister may comprise a carbon dust filter at or near the canister purge port, as shown in FIGS. 3A-3B. Such a filter may become clogged with carbon dust and other particulate matter over time, restricting air flow through the purge port. As such, canister purging operations may be disrupted, and fuel vapor may saturate the canister, leading to an increase in undesired emissions. To mitigate this, a purge routing valve may be provided, allowing the canister load port to be coupled to the engine intake. As shown in FIG. 4, the purge routing valve may be used to determine whether the canister purge port is restricted, by applying engine intake vacuum to the fuel system and adjusting the position of the routing valve. If a vacuum cannot be drawn on the fuel tank via the purge port, but can when the purge routing valve is actuated, a restricted purge port is inferred. As shown in FIG. 5, the canister can still be purged during this condition, by applying vacuum to the canister via the load port. An example timeline for operating a fuel system comprising a canister purge routing valve to diagnose canister purge port restrictions and to purge the fuel vapor canister via this alternate path is shown in FIG. 6.

Figure 1:
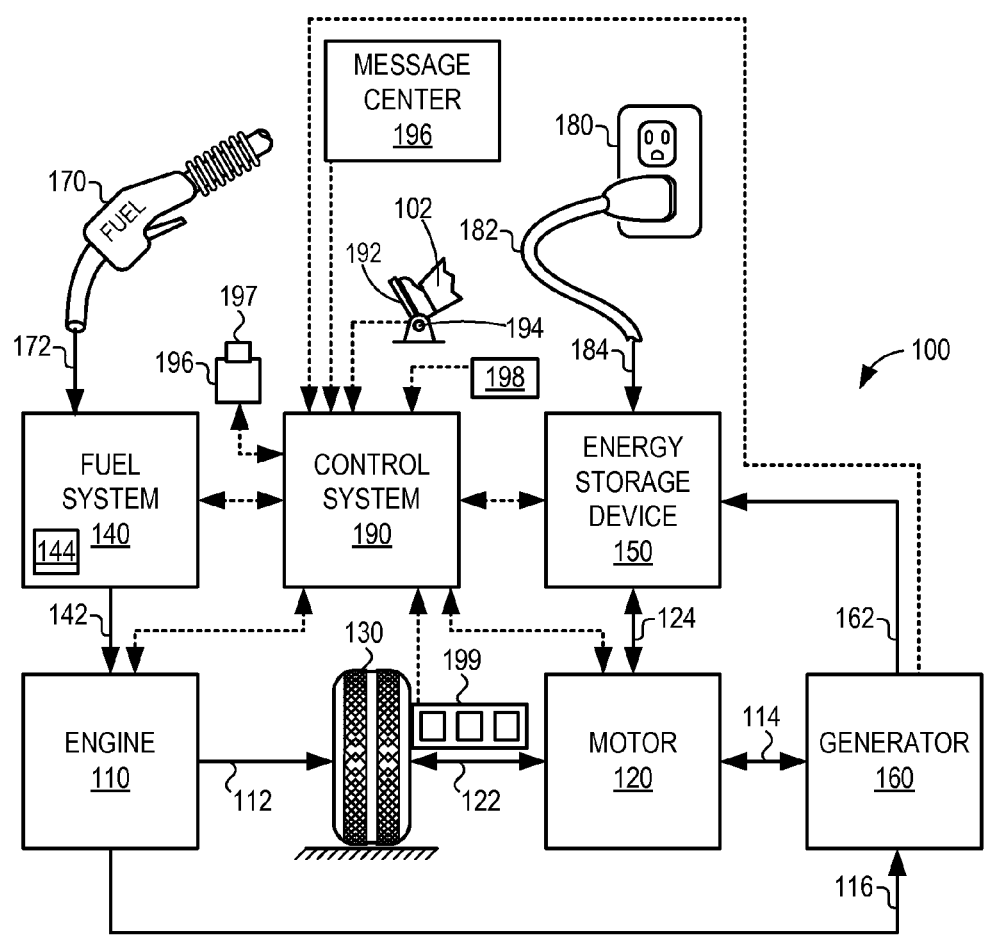
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 6, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that vapor blocking valve 252 (VBV) may control venting of fuel tank 220 with the atmosphere. VBV 252 may be positioned between the fuel tank and the fuel vapor canister within fuel tank ventilation line 278. VBV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open VBV 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open vapor blocking valve 252, while maintaining canister purge valve 261 closed, to depressurize the fuel tank before allowing enabling fuel to be added therein. As such, vapor blocking valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing vapor blocking valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 279, and canister temperature sensor 232. Other sensors such as pressure, temperature, air/fuel ratio, and composition sensors may be coupled to various locations in the vehicle system 206. As another example, the actuators may include throttle 262, vapor blocking valve 252, canister purge valve 261, and canister vent valve 277. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 4 and 5.

In some examples, the controller may be placed in a reduced power mode or sleep mode, wherein the controller maintains essential functions only, and operates with a lower battery consumption than in a corresponding awake (or full power) mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Undesired emission detection routines may be intermittently performed by controller 212 on fuel system 218 to confirm that the fuel system is not degraded. As such, undesired emission detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, undesired emission detection routines may be performed while the engine is running by operating a vacuum pump and/or using engine intake manifold vacuum.

In some configurations, a canister vent valve (CVV) 277 may be coupled within vent line 227. CVV 277 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 277 may be a solenoid valve wherein opening or closing of the valve is performed via actuation of a canister vent solenoid. In particular, the canister vent valve may be an open that is closed upon actuation of the canister vent solenoid. In some examples, CVV 277 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

The adsorbent stored in canister 222 may discharge carbon dust over the life of the canister. During purge events, the carbon dust may migrate out of the canister and into purge line 228. Dust may become stuck in CPV 261, which may prevent the valve from shutting completely. A leaky CPV may cause damage to the fuel tank and evaporative emissions system, as intake manifold vacuum would thus be constantly applied through the valve. Further, this may cause increases in undesired emissions as well as increase in engine stalling events. As such, canister 222 may comprise a carbon dust filter within the canister near the purge outlet (not shown, see FIGS. 3A-3B for additional canister features). However, such a carbon dust filter is prone to clogging over time, both with carbon dust, the release of which may be exacerbated by liquid fuel entering the canister, and with dirt and other particulate matter drawn in through air filter 259. If the flow through the canister purge port becomes restricted, canister purging will be affected. If the canister cannot be purged, fuel vapor will saturate the adsorbent and result in an increase in emissions. Further, undesired emissions tests that rely on engine intake vacuum to evacuate the fuel and evaporative emissions systems will be impacted if vacuum cannot be applied via the canister purge port.

As such, fuel system 218 may comprise purge routing valve (PRV) 291. Purge routing valve 291 may be a two-way switching valve as shown, an L-Type three-way ball valve, or other appropriate valve that enables the coupling of one out of two inlet conduits to an outlet conduit. As shown in FIG. 2, purge line 228 is coupled to an outlet of PRV 291, and fluidically coupled to fuel vapor canister 222 via purge outlet 293, which is coupled to the canister purge port. Fuel tank ventilation line 278 is coupled to PRV 291 via branch conduit 295. Branch conduit 295 may be coupled to fuel tank ventilation line 278 at a junction situated between the VBV 252 and canister 222. Actuation of PRV 291 thus fluidically couples purge line 228 to fuel vapor canister 222 via branch conduit 295 and fuel tank ventilation line 278, which is coupled to the canister load port. In this way, the canister purge port may be bypassed to allow canister purging during conditions where the purge port is restricted (e.g., clogging of the carbon dust filter).

FIGS. 3A and 3B schematically show a portion of a fuel system 300 comprising a fuel vapor canister 302 and a purge routing valve 304. Fuel system 300 may be an example of fuel system 218, while fuel vapor canister 302 may be an example of fuel vapor canister 222 and purge routing valve 304 may be an example of purge routing valve 291.

Canister 302 may comprise a load conduit 306 that may be coupled to a fuel tank via a fuel tank ventilation line 308. A vapor blocking valve (VBV) 310 may be deposed in fuel tank ventilation line 308 in order to regulate the flow of fuel vapor between the fuel tank and load conduit 306. Load conduit 306 may be coupled to load port 312, traversing an outer wall of canister 302. In some examples, load port 312 may be coupled to canister buffer 314.

Canister 302 may further comprise a fresh air conduit 316 that may be coupled to atmosphere via canister vent line 318. A canister vent valve (CVV) 320 may be deposed in vent line 318 in order to regulate the flow of air and gasses between atmosphere and fresh air conduit 316. Fresh air conduit 316 may be coupled to fresh air port 322, traversing an outer wall of canister 302. In some examples, fresh air port 322 may be coupled to bleed element 324.

Canister 302 may further comprise a purge conduit 326 that may be coupled to an engine intake via purge line 328. A canister purge valve (CPV) 330 may be deposed in purge line 328 in order to regulate the flow of purge gasses between the engine intake and purge conduit 326. Purge conduit 326 may be coupled to purge port 332, traversing an outer wall of canister 302. In some examples, purge port 322 may be coupled to carbon dust filter 334 and/or canister buffer 314.

Load port 312, fresh air port 322, and purge port 332 may extend into a central cavity 336 of canister 302 in order to facilitate the flow of gasses in and out of canister 302. As described with regard to canister 222, the central cavity 336 of canister 302 may be filled with an adsorbent material 338, which may comprise any suitable material for temporarily trapping fuel vapors (including vaporized hydrocarbons)

generated during fuel tank refueling operations, as well as diurnal vapors. In one example, adsorbent material 338 is activated charcoal pellets. Bleed element 324 may also comprise an adsorbent, which may be the same adsorbent as that of adsorbent material 338. However, as bleed element 324 may function to prevent bleed emissions during prolonged engine off soaks wherein fuel vapor may migrate within adsorbent 338 towards vent port 322, bleed element 324 may bind fuel vapor more tightly than adsorbent 338, and/or may comprise a restrictive pathway to reduce air flow through the bleed element (e.g., a honeycomb structure).

Fuel vapor entering central cavity 336 via load port 312 may bind to adsorbent material 338, while gasses stripped of fuel vapor may then exit canister 302 via fresh air port 322. In some examples, a partition 340 may extend between fresh air port 322 and ports 312 and 332 to facilitate distribution of fuel vapor and fresh air throughout central cavity 336, though partition 340 may not completely isolate the fresh air side of canister 302 from the load side.

Purge routing valve 304 may be coupled to purge conduit 326 via purge outlet 342, and to fuel tank ventilation line 308 via branch conduit 344. In a first conformation, as shown in FIG. 3A, purge routing valve 304 fluidically couples purge line 328 to purge outlet 342. In a second conformation, as shown in FIG. 3B, purge routing valve 304 fluidically couples purge line 328 to branch conduit 344. In this way, purge routing valve 304 allows for purging of canister 302 via either purge port 332 (FIG. 3A) or load port 312 (FIG. 3B). The technical result of implementing purge routing valve 304 is that fuel vapor canister 302 may be purged via load port 312 during conditions wherein purge port 332 is restricted, such as when carbon dust filter 334 is clogged.

As an example, the fuel systems depicted in FIGS. 3A and 3B are being operated in a purging mode. As such, CVV 320 is in an open conformation, VBV 310 is in a closed conformation, CPV 330 is in an open conformation, and the engine intake (not shown) holds a vacuum. The direction of gas flow through fuel system 300 is represented by arrows. In FIG. 3A, purge routing valve 304 is in a first conformation, coupling purge outlet 342 to purge line 328. Accordingly, the engine intake vacuum is applied to purge port 332. Atmospheric air enters canister vent line 318 via CVV 320, and then enters fresh air port 322 via fresh air conduit 316. As the atmospheric air enters bleed element 324, central cavity 336, and canister buffer 314, hydrocarbons are desorbed from adsorbent 338. As purge routing valve 304 is in the first conformation, the desorbed hydrocarbons exit fuel vapor canister 302 by sequentially passing through carbon dust filter 334, purge port 332, and purge conduit 326. The purge gasses then pass through purge routing valve 304 via purge outlet 342, traverse CPV 330, and are directed to engine intake for combustion via purge line 328.

In FIG. 3B, purge routing valve 304 is in a second conformation, coupling branch conduit 344 to purge line 328. Accordingly, the engine intake vacuum is applied to load port 312. Atmospheric air enters canister vent line 318 via CVV 320, and then enters fresh air port 322 via fresh air conduit 316. As the atmospheric air enters bleed element 324, central cavity 336, and canister buffer 314, hydrocarbons are desorbed from adsorbent 338. As purge routing valve 304 is in the second conformation, the desorbed hydrocarbons exit fuel vapor canister 302 by sequentially passing through load port 312, and load conduit 306. The purge gasses then pass through purge routing valve 304 via branch conduit 344, traverse CPV 330, and are directed to engine intake for combustion via purge line 328.

In some examples, an additional filter element may be coupled between load port 312 and purge routing valve 304 to prevent carbon dust from reaching CPV 330 when canister 302 is purged via load port 312. For example, a filter may be coupled within branch conduit 344. In some embodiments, an additional valve may deposed in branch conduit 344 to prevent flow of fuel vapor from the fuel tank into purge line 328 during conditions wherein load port 312 is fluidically coupled to purge line 328, CPV 330 is open, and VBV 310 is opened. In this way, engine stalling events due to vapor slugs during fuel tank venting events.

The inclusion of a purge routing valve (e.g., purge routing valves 291 and 304) within a fuel system also enables methods for determining whether a canister purge port is restricted. FIG. 4 depicts a flow chart for a high level method 400 for a canister purge port restriction test. Instructions for carrying out method 400 and other methods included herein may be executed by a controller (e.g., controller 212) based on instructions stored in non-transitory memory of the controller, and in conjunction with signals received from sensors of the engine system and fuel system, such as the sensors described above with reference to FIGS. 1, 2, 3A, and 3B. The controller may employ actuators of the fuel system to adjust fuel system operation, according to the methods described below. While described with reference to the systems depicted in FIGS. 1, 2, 3A, and 3B, it should be understood that method 400 or similar methods may be applied to other systems without departing from the scope of this disclosure.

Method 400 begins at 405, where the method includes evaluating operating conditions. Operating conditions may be measured, estimated, and/or inferred. Operating conditions may include various ambient conditions, such as temperature, humidity, and barometric pressure, various engine conditions, such as engine operating status, engine speed, engine load, etc., various fuel system conditions, such as fuel level, fuel tank pressure, fuel vapor canister load status, etc., as well as other vehicle system and sub-system conditions. Continuing at 410, method 400 includes determining whether a canister purge port restriction test is indicated. A canister purge port restriction test indication may include a flag set at a controller. Such a flag may be set in response to a pre-determined duration elapsing from a previous canister purge port restriction test, in response to a prior failing or indeterminate test result, in response to specific engine and/or fuel system conditions being met, etc. If a canister purge port restriction test is not indicated, method 400 proceeds to 412. At 412, method 400 includes maintaining the current status of the fuel system and engine system. Method 400 may then end.

If a canister purge port restriction test is indicated, method 400 proceeds to 415. At 415, method 400 includes determining whether an intake manifold vacuum is greater than a threshold. The current intake manifold vacuum may be measured (e.g., using a manifold adjusted pressure sensor coupled within the engine intake), estimated, or inferred. The intake manifold vacuum threshold may be pre-determined or may be based on current operating conditions. The intake manifold vacuum threshold may represent a minimum vacuum level required to evacuate the fuel system to a target pressure or vacuum. If the intake manifold vacuum is below the threshold, for example, if the vehicle is operating in a battery-only mode or at wide-open throttle, method 400 proceeds to 417. At 417, method 400 includes maintaining the current fuel system status until the intake manifold vacuum increases above the threshold. If the intake manifold vacuum increases above the threshold during the current drive cycle, method 400 may return to 405 and proceed following a re-evaluation of operating conditions. If the drive cycle ends (e.g., a vehicle-off event) prior to the intake manifold vacuum increasing above the threshold, method 400 may include setting a flag to follow up with a canister purge port restriction test during a subsequent condition. In some examples, a vacuum pump or alternate vacuum source may be utilized for the canister purge port restriction test rather than the intake manifold. In such embodiments, the method may proceed regardless of the current intake manifold vacuum, or may be scheduled to initiate during specific operating conditions (e.g., during a vehicle-off condition).

If the intake manifold vacuum is greater than the threshold, method 400 proceeds to 420. At 420, method 400 includes closing a canister vent valve, such as CVV 277 or CVV 320, or otherwise restricting air and gas flow through a canister vent line. Continuing at 425, method 400 includes opening a canister purge valve, such as CPV 261 or 330, thereby coupling the fuel system to the intake manifold, and thus evacuating the fuel system while the fuel system is sealed from atmosphere. The canister purge routing valve may be maintained in a first conformation such that the engine intake is fluidically coupled to the canister purge port, as depicted in FIG. 3A. A vapor blocking valve, such as VBV 252 or VBV 310 may be opened or maintained open such that the canister load port is fluidically coupled to the fuel tank, and thus to a fuel tank pressure sensor, such as FTPT 279. The output of the fuel tank pressure sensor may then be monitored.

Continuing at 430, method 400 includes determining whether the fuel tank vacuum increases above a threshold. The fuel tank vacuum threshold may be predetermined or may be based on current operating conditions (e.g., fuel tank fill level). The fuel tank vacuum threshold may represent a fuel tank vacuum that is expected if the fuel system is intact and flow through the canister purge port is not restricted, thus allowing the engine intake vacuum to be applied to the fuel tank. In some examples, a rate of change of fuel tank vacuum may be compared to an expected rate of change.

If the fuel tank vacuum increases above the threshold, method 400 proceeds to 435. At 435, method 400 includes indicating that the canister purge port is permissive. Indicating that the canister purge port is permissive may include recording the passing test result at the controller. Continuing at 440, method 400 includes updating the canister purge port restriction test schedule based on the passing test result. Continuing at 445, method 400 includes restoring the status of the evaporative emissions system. For example, the CVV may be opened, and the CPV may be closed. Method 400 may then end.

Returning to 430, if the fuel tank vacuum does not increase above the threshold, method 400 then proceeds to 445. At 445, method 400 includes actuated the canister purge routing valve such that the engine intake is fluidically coupled to the canister load port, as depicted in FIG. 3B, and thus the intake vacuum is applied to the fuel tank via the branch conduit and the fuel tank ventilation line while bypassing the fuel vapor canister. Continuing at 450, method 400 includes determining if the fuel tank vacuum increases above a threshold. The threshold may be the same threshold described at 430, or may be a different threshold. The fuel tank vacuum threshold may represent a fuel tank vacuum that is expected if the fuel system is intact and flow through the canister load port is not restricted, thus allowing the engine intake vacuum to be applied to the fuel tank.

If the fuel tank vacuum does not increase above the threshold, method 400 proceeds to 455. At 455, method 400 includes indicating that the canister purge port is permissive. As the intake vacuum was not able to be applied to the fuel tank via the canister purge port or the canister load port, it may be assumed that the problem is either upstream or downstream of the purge port. For example, the CPV may be stuck in a closed position, a restriction may exist between the CPV and the canister purge routing valve, a restriction may exist in the fuel take ventilation line, the vapor blocking valve may be stuck in a closed position, or a gross leak may exist in the evaporative emissions system. A diagnostic code may be indicated, and the vehicle operator may be notified (e.g., a malfunction indicator light may be illuminated). Continuing at 460, method 400 includes indicating CPV function tests, undesired emissions tests, and other diagnostic tests aimed at discerning the reason that intake vacuum cannot be applied to the fuel tank. Indicating diagnostic tests may include setting one or more flags at the controller, and may further include taking inventory of recent diagnostic tests in order to prioritize the order of diagnostic test execution based on recent results. Method 400 then proceeds to 445, and includes restoring the status of the evaporative emissions system. For example, the CVV may be opened, the CPV may be closed, and the canister purge routing valve may be returned to the default (first) position, where the canister purge line is coupled to the canister purge port. Method 400 may then end.

Returning to 455, if the fuel tank vacuum increases above the threshold while the canister purge routing valve is actuated, method 400 proceeds to 470, and includes indicating a canister purge port restriction, as intake vacuum was able to be applied to the fuel tank via the branch conduit, but not the purge port. Indicating that the canister purge port is restricted may include recording the failing test result at the controller, and may further include notifying the vehicle operator. Continuing at 475, method 400 includes updating canister purge parameters. For example, the canister purge parameters may be updated to indicate that canister purging should be done via the load port and not via the purge port. An example purge routing is described herein and with regard to FIG. 5. Continuing at 480, method 400 includes updating undesired emissions test parameters. For example, undesired emissions tests may be suspended while the canister purge port is restricted. In some examples, some tests may be suspended while other tests are executed. The parameters for the executed tests may be adjusted based on the canister purge port restriction. Method 400 may then proceed to 445, and includes restoring the status of the evaporative emissions system. For example, the CVV may be opened, the CPV may be closed, and the canister purge routing valve may be returned to the default (first) position, where the canister purge line is coupled to the canister purge port. Method 400 may then end.

FIG. 5 depicts a flow chart for a high level method 500 for a canister purge port restriction test. Instructions for carrying out method 500 and other methods included herein may be executed by a controller (e.g., controller 212) based on instructions stored in non-transitory memory of the controller, and in conjunction with signals received from sensors of the engine system and fuel system, such as the sensors described above with reference to FIGS. 1, 2, 3A, and 3B. The controller may employ actuators of the fuel system to adjust fuel system operation, according to the methods described below. While described with reference to the systems depicted in FIGS. 1, 2, 3A, and 3B, it should be understood that method 500 or similar methods may be applied to other systems without departing from the scope of this disclosure.

Method 500 begins at 505, where the method includes evaluating operating conditions. Operating conditions may be measured, estimated, and/or inferred. Operating conditions may include various ambient conditions, such as temperature, humidity, and barometric pressure, various engine conditions, such as engine operating status, engine speed, engine load, etc., various fuel system conditions, such as fuel level, fuel tank pressure, fuel vapor canister load status, etc., as well as other vehicle system and sub-system conditions. Continuing at 510, method 500 includes determining whether a canister load is greater than a threshold. The canister load may be measured, estimated, or inferred. For example, the canister load may be based on an amount of fuel vapor adsorbed by the canister since a previous canister purging event as determined via canister temperature changes, fuel tank pressure changes, hydrocarbon sensor readings, etc. The canister load threshold may be pre-determined or may be based on current operating conditions. If the canister load is below the threshold, method 500 proceeds to 515, and includes maintaining the current status of the evaporative emissions system and the fuel system. Method 500 may then end.

If the canister load is above the threshold, method 500 proceeds to 520, and includes determining whether purge conditions are met. Determining whether purge conditions are met may include evaluating engine operating status, engine intake vacuum level, and commanded A/F ratio, and determining whether a purge event can be performed without disrupting engine operations. If purge conditions are not met, method 500 may proceed to 525. At 525, method 500 may include maintaining the current status of the evaporative emissions control and fuel systems until purge conditions are met. Method 500 may then end. Although purge conditions may be met at the beginning of method 500, if operating conditions change during the execution of method 500, the purge operation may be aborted, and the emissions control system and fuel system restored to a default conformation. A flag may be set at a controller, such as controller 212 to follow up when purge conditions are again met. Method 500 may then end.

If purge conditions are met, method 500 proceeds to 530. At 530, method 500 includes determining whether the canister purge port is restricted. Determining whether the canister purge port is restricted may include retrieving a diagnostic code or test result from a controller, which may be triggered as described with regard to FIG. 4. If the canister purge port is not restricted, method 500 proceeds to 535, and includes closing the VBV, in order to prevent drawing fuel tank vapors into the engine intake during the purge event. At 540, method 500 includes maintaining the purge routing valve conformation such that the engine intake is fluidically coupled to the canister purge port. Continuing at 545, method 500 includes opening the CPV, thereby coupling the engine intake to the fuel vapor canister, and purging the contents of the fuel vapor canister to the engine intake. The duty cycle of the CPV may be ramped up gradually, as the purge gas concentration is learned and updated.

This conformation may be maintained for a duration, either pre-determined or based on current operating conditions. For example, the conformation may be maintained until the purge gas concentration decreases below a threshold, or the canister load is otherwise determined to be below a threshold. If the purge gas concentration is lower than an expected concentration, the purge routing valve may be actuated to couple the engine intake to the canister load port. If the purge gas concentration increases in this conformation, it may be maintained for the duration of the purge event, and a canister purge port restriction test may be indicated. If the purge gas concentration does not increase, the purge event may be aborted, and further diagnostic tests may be indicated.

Method 500 then proceeds to 550, and includes restoring the status of the fuel system. For example, the CPV may be closed, and the VBV may be opened. Continuing at 555, method 500 includes updating a canister load at the controller. A purge schedule may be updated based on the updated canister load. Method 500 may then end.

Returning to 530, if the canister purge port is indicated to be restricted, method 500 proceeds to 560, and includes closing the VBV. Continuing at 565, method 500 includes actuating the purge routing valve, thereby fluidically coupling the canister load port to the canister purge line. Method 500 then proceeds to 545, and includes opening the CPV and purging the contents of the fuel vapor canister as described above. Following the purge event, the fuel system status is restored to a non-purging conformation, and a canister load is updated. Method 500 may then end.

FIG. 6 shows an example timeline 600 for operating a vehicle fuel system and evaporative emissions system comprising a purge routing valve, such as the systems described herein and with regard to FIGS. 2, 3A, and 3B, using the methods described herein and with regard to FIGS. 4 and 5. Timeline 600 includes plot 610, indicating an engine intake manifold vacuum over time. Line 615 represents an intake manifold vacuum threshold for performing a canister purge port restriction test, as described with regard to FIG. 4, as well as a threshold for performing a canister purge event, as described with regard to FIG. 5. Timeline 600 further includes plot 620, indicating a canister vent valve status over time; plot 630, indicating a vapor blocking valve status over time; plot 640, indicating a canister purge valve status over time; and plot 650, indicating a purge routing valve status over time. Timeline 600 further includes plot 660, indicating a fuel tank pressure over time. Line 665 represents a fuel tank vacuum threshold for a canister purge port restriction test, as described with regard to FIG. 4. Timeline 600 further includes plot 670, indicating a canister load over time. Line 675 represents a canister load threshold for initiating a canister purge event. Finally, timeline 600 includes plot 680, indicating whether a canister purge port restriction is indicated over time.

At time $t_0$, intake manifold vacuum, as depicted by plot 610, is above the threshold represented by line 615. The canister vent valve and vapor blocking valve are both open, as indicated by plots 620 and 630, respectively, while the canister purge valve is closed, as indicated by plot 640. At time $t_1$, a canister purge port restriction test is initiated. Accordingly, the canister vent valve is closed and the canister purge valve is opened, while the vapor blocking valve is maintained open, and the purge routing valve is maintained in a conformation wherein the canister purge port is fluidically coupled to the canister purge line. In this conformation, the intake manifold vacuum is applied to the canister purge port. The fuel tank pressure decreases slightly, as indicated by plot 660. However, at time $t_2$, the fuel tank pressure plateaus prior to reaching the threshold vacuum represented by line 665. Accordingly, the purge routing valve is placed in a conformation wherein the canister load port is fluidically coupled to the canister purge line, and intake manifold vacuum is coupled to the fuel tank, bypassing the fuel vapor canister.

From time $t_2$ to time $t_3$, the fuel tank pressure decreases until reaching the threshold indicated by line 665. Thus, a canister purge port restriction is indicated, as shown by plot 680. The canister vent valve is opened, the canister purge valve is closed, and the purge routing valve is returned to a conformation wherein the canister purge port is fluidically coupled to the canister purge line. Fuel tank pressure returns to atmospheric pressure.

At time $t_4$, the canister load, as indicated by plot 670, increases above the threshold represented by line 675. As the intake manifold vacuum is above the threshold represented by line 615, a canister purging event is then initiated. The canister vent valve is maintained open, and the vapor blocking valve is closed. As a canister purge port restriction has been indicated, the purge routing valve is actuated so as to fluidically couple to the canister purge line to the canister load port, and the canister purge valve is opened. In this conformation, the contents of the canister are purged to engine intake. The canister load decreases from time $t_4$ to time $t_5$, as shown by plot 675. At time $t_5$, the purge event ends. Accordingly, the vapor blocking valve is opened, the canister purge valve is closed, and the purge routing valve is returned to a conformation wherein the canister purge port is fluidically coupled to the canister purge line.

The systems described herein and with reference to FIGS. 1, 2, 3A, and 3B, along with the methods described herein and with reference to FIGS. 4 and 5 may enable one or more systems and one or more methods. In one example, a method for an engine is presented, comprising: during a first condition, routing purge air through a fuel vapor canister such that desorbed fuel vapor traverses a canister purge port en route to an engine intake; and during a second condition, routing purge air through the fuel vapor canister such that desorbed fuel vapor traverses a canister load port en route to the engine intake. In such an example, or any other example, routing purge air through the fuel vapor canister such that desorbed fuel vapor traverses the canister purge port en route to the engine intake may additionally or alternatively comprise: placing a purge routing valve in a first conformation, wherein the canister purge port is fluidically coupled to a canister purge line; and opening a canister purge valve. In any of the preceding examples, or any other example, routing purge air through a fuel vapor canister such that desorbed fuel vapor traverses a canister load port en route to an engine intake may additionally or alternatively comprise: placing a purge routing valve in a second conformation, wherein the canister load port is fluidically coupled to a canister purge line, and the canister purge port is not fluidically coupled to the canister purge line; and opening the canister purge valve. In any of the preceding examples, or any other example, the first condition may additionally or alternatively comprise an indication that that flow through the canister purge port is not restricted. In any of the preceding examples, or any other example, the second condition may additionally or alternatively comprise an indication that flow through the canister purge port is restricted. The technical result of implementing this method is that a fuel vapor canister may be purged even if flow through the canister purge port is restricted. In this way, a carbon dust filter may be placed within the canister to prevent fouling of a canister purge valve, but the canister can still be purged if the filter becomes clogged.

In another example, a fuel system is presented, comprising: a fuel vapor canister comprising at least a load port and a purge port; a canister purge line coupled between the fuel vapor canister and an engine intake; a purge routing valve coupled to the canister purge line, such that when the purge routing valve is in a first conformation, the canister purge line is fluidically coupled to the fuel vapor canister via the purge port, and when the purge routing valve is in a second conformation, the canister purge line is fluidically coupled to the fuel vapor canister via the load port and not via the purge port. In such an example, or any other example, the fuel system may additionally or alternatively comprise a fuel tank coupled to the load port via a fuel tank ventilation line, and the purge routing valve may additionally or alternatively be coupled to the load port via the fuel tank ventilation line. In any of the preceding examples, or any other example, the fuel system may additionally or alternatively comprise a vapor blocking valve coupled within the fuel tank ventilation line between the fuel tank and the fuel vapor canister. In any of the preceding examples, or any other example, the purge routing valve may additionally or alternatively be coupled to the fuel tank ventilation line at an intersection between the vapor blocking valve and the load port. In any of the preceding examples, or any other example, the purge routing valve may additionally or alternatively be coupled to the fuel tank ventilation line via a branch conduit. In any of the preceding examples, or any other example, the fuel vapor canister may additionally or alternatively comprise a vent port coupled to a canister vent line, and a canister vent valve may additionally or alternatively be coupled between the vent port and atmosphere, and wherein a canister purge valve is coupled between the purge routing valve and the engine intake. In any of the preceding examples, or any other example, the fuel system may additionally or alternatively comprise a carbon dust filter coupled within the fuel vapor canister at the purge port. The technical result of implementing this system is a reduction in vehicle emissions due to restrictions in the purge port of the fuel vapor canister. By incorporating a purge routing valve, the canister may be purged via an alternate pathway, decreasing the amount of time the canister is saturated with hydrocarbons, and thus preventing bleed emissions.

In yet another example, a method for an engine is presented, comprising: applying an engine intake vacuum to a fuel system via a purge port of a fuel vapor canister; responsive to a fuel tank vacuum not reaching a threshold, bypassing the purge port and applying the engine intake vacuum to the fuel system; and indicating a restriction in the purge port responsive to a fuel tank vacuum reaching a threshold when the purge port is bypassed. In this example, or any other example, applying an engine intake vacuum to a fuel system via a purge port may additionally or alternatively comprise: closing a canister vent valve coupled within a canister vent line between the fuel vapor canister and atmosphere; opening a vapor blocking valve coupled within a fuel tank ventilation line between the fuel vapor canister and a fuel tank; maintaining a purge routing valve in a first conformation; and opening a canister purge valve coupled within a canister purge line between the fuel vapor canister and an engine intake.

In any of the preceding examples, or any other example, applying the engine intake vacuum to the fuel system while bypassing the purge port may additionally or alternatively comprise: placing the purge routing valve in a second conformation, such that the canister purge line is couple to the fuel tank ventilation line. In any of the preceding examples, or any other example, the method may additionally or alternatively comprise: indicating that the purge port is permissive to flow responsive to a fuel tank vacuum reaching the threshold when the engine intake vacuum is being applied to the fuel system via the purge port. In any of the preceding examples, or any other example, the method may additionally or alternatively comprise: indicating that the purge port is permissive to flow responsive to a fuel tank vacuum not reaching the threshold when the engine intake vacuum is being applied to the fuel system when the purge port is bypassed. In any of the preceding examples, or any other example, the method may additionally or alternatively comprise: indicating a canister purge valve functionality test and a fuel system emissions test responsive to a fuel tank vacuum not reaching the threshold when the engine intake vacuum is being applied to the fuel system when the purge port is bypassed. In any of the preceding examples, or any other example, the method may additionally or alternatively comprise: updating canister purge parameters responsive to an indication of a restriction in the purge port. In any of the preceding examples, or any other example, updating canister purge parameters may additionally or alternatively comprise indicating to bypass the purge port during a canister purge event. The technical effect of implementing this method is that a clogged purge port may be diagnosed and thus addressed by replacing a carbon dust filter, rather than requiring the replacement of the entire canister. In this way, warranty costs can be decreased.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   applying an engine intake vacuum to a fuel system via a purge port of a fuel vapor canister;
   responsive to a fuel tank vacuum not reaching a threshold, bypassing the purge port and applying the engine intake vacuum to the fuel system; and
   indicating a restriction in the purge port responsive to the fuel tank vacuum reaching the threshold when the purge port is bypassed.

2. The method of claim 1, wherein applying the engine intake vacuum to the fuel system via the purge port comprises:
   closing a canister vent valve coupled within a canister vent line between the fuel vapor canister and atmosphere;
   opening a vapor blocking valve coupled within a fuel tank ventilation line between the fuel vapor canister and a fuel tank;
   maintaining a purge routing valve in a first conformation; and
   opening a canister purge valve coupled within a canister purge line between the fuel vapor canister and an engine intake.

3. The method of claim 2, wherein applying the engine intake vacuum to the fuel system while bypassing the purge port comprises:
   placing the purge routing valve in a second conformation, such that the canister purge line is coupled to the fuel tank ventilation line.

4. The method of claim 1, further comprising:
   indicating that the purge port is permissive to flow responsive to the fuel tank vacuum reaching the threshold when the engine intake vacuum is being applied to the fuel system via the purge port.

5. The method of claim 1, further comprising:
   indicating that the purge port is permissive to flow responsive to the fuel tank vacuum not reaching the threshold when the engine intake vacuum is being applied to the fuel system when the purge port is bypassed.

6. The method of claim 5, further comprising:
   indicating a canister purge valve functionality test and a fuel system emissions test responsive to the fuel tank vacuum not reaching the threshold when the engine intake vacuum is being applied to the fuel system when the purge port is bypassed.

7. The method of claim 1, further comprising:
   updating canister purge parameters responsive to the indication of the restriction in the purge port.

8. The method of claim 7, wherein updating the canister purge parameters comprises indicating to bypass the purge port during a canister purge event.

* * * * *